No. 805,384. PATENTED NOV. 21, 1905.
R. N. SCHALKENBACH.
GLAZED STRUCTURE.
APPLICATION FILED AUG. 10, 1904.
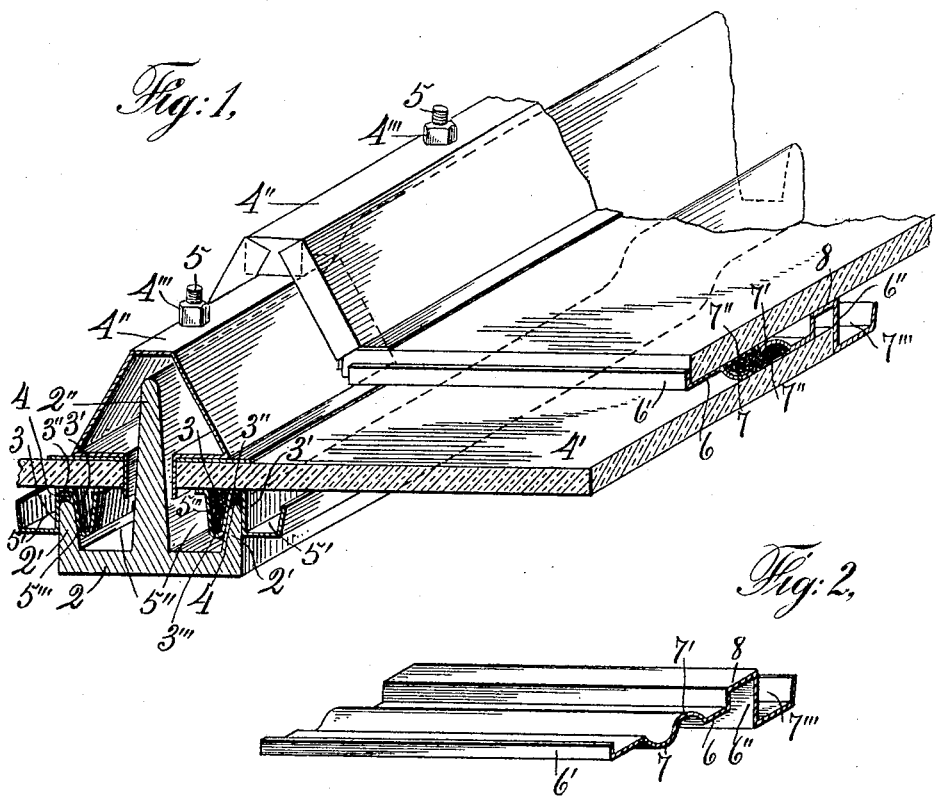
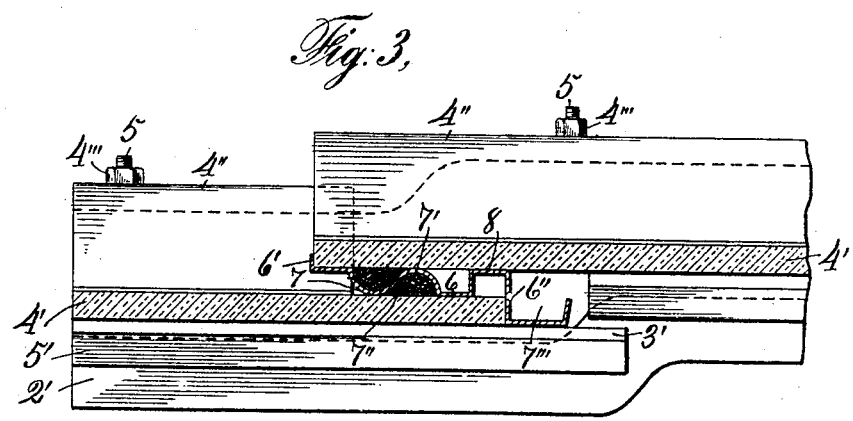
Witnesses
Max B. A. Doring.
F. B. Wright
Inventor
Robert N. Schalkenbach
By his Attorney Albert E. Tanner

UNITED STATES PATENT OFFICE.

ROBERT N. SCHALKENBACH, OF JERSEY CITY, NEW JERSEY.

GLAZED STRUCTURE.

No. 805,384.  Specification of Letters Patent.  Patented Nov. 21, 1905.

Application filed August 10, 1904. Serial No. 220,188.

*To all whom it may concern:*

Be it known that I, ROBERT N. SCHALKENBACH, a citizen of the United States, and a resident of Jersey City, in the county of Hudson and State of New Jersey, have invented certain new and useful Improvements in Glazed Structures, which improvements are fully set forth in the following specification.

This invention relates to improvements in constructions of that class embodying metallic members supporting panes of glass, such constructions being commonly known as "glazed structures;" and it primarily has reference to glazed structures in which the panes of glass availed of are arranged to lap each somewhat beyond its neighbor.

The objects of this invention are to provide a glazed structure which shall embody novel features of construction whereby are insured a cushioned relation between each of the panes of glass made use of and its neighbor and between each of said panes of glass and its metallic supporting members, together with a permanent water-tight closure at the lapped portions of said panes of glass, which shall be simple and inexpensive as regards construction, durable, efficient, and reliable in practical service, and which shall possess certain well-defined advantages over prior analogous constructions.

The invention consists in the novel details, parts, and combinations to be hereinafter more specifically described, including the novel disposition and relative arrangement of said parts, whereby the attainment of the foregoing objects is rendered practicable, all of which will be particularly set forth in the appended claims.

The invention is clearly illustrated in the accompanying drawings, wherein similar reference-numerals denote corresponding parts throughout the several views.

In said drawings, Figure 1 is a view showing in perspective a fragment of a glazed structure embodying my said improvements. Fig. 2 is a view showing in perspective and separately the retaining-clip which I make use of as an element of my present construction. Fig. 3 is a side elevation, partly in section, of the construction illustrated in Fig. 1.

In a general sense my present invention comprises an astragal having an upright side flange, a shielding packing-clip straddling and cushioned on said flange, panes of glass on said holder, and a resilient cap conjoined with said astragal and exerting an elastic pressure downwardly on said panes of glass.

It further comprises panes of glass lapped each somewhat beyond its neighbor, means for supporting said panes of glass, a channeled retaining-clip between the lapped portions of said panes of glass, and packing material in the channel or channels of said retaining-clip.

It still further comprises panes of glass lapped each somewhat beyond its neighbor, means for supporting said panes of glass, a retaining-clip between the lapped portions of said panes of glass, said clip being constructed and arranged to grasp the respective lapped portions of glass and hold the same against displacement one with respect to the other, and a cap conjoined with said glass-supporting means and exerting a downward pressure on said lapped panes of glass.

Having reference to the accompanying drawings, I make use of the usual astragal, comprising a base 2, upright flanges 2', and a central vertical web 2". I further make use of a packing-clip which essentially comprises opposing depending side members 3 3', connected at their upper extremities so as to form an inverted packing-channel 3". This packing-clip may be readily formed by folding a piec of metal, as sheet-copper of suitable thickness, somewhat upon itself, and when adjusted for service said clip straddles the flange 2' after the manner indicated in the accompanying drawings. Hence the packing material 4, preferably of asbestos fiber and which is inserted in the channel 3" prior to the adjustment of the packing-clip with respect to the flange 2', as stated, and is accordingly substantially housed and shielded by said packing-clip against water of condensation, grit, and other foreign substances directed thereat in practice and which would tend to seriously and quickly impair the normal elasticity thereof, serves to cushion said clip on said flange and accordingly provide a like cushioned seat for the panes of glass 4', which in practice rest on the packing-clip aforenamed at the upper extremity thereof. The resilient cap 4", through the medium of the nut 4'" and bolt 5, the latter projecting upwardly from the web 2" and through the cap 4" to receive the nut 4'", or a plurality of such bolts and nuts, all as in common practice, exerts an elastic downward pressure on said panes of glass, thus in conjunction with the packing material 4 providing a yielding retaining-grasp on said panes of glass at the upper and lower sides or faces thereof, an effect which is highly desirable in glazed constructions. In practice I purpose to sufficiently extend the side member 3' so that it may be returned somewhat, but not to and in engagement with the glass 4', for the formation of a condensation-gutter 5', which shall extend along the flange 2' at the outer side thereof and underneath the glass 4', as clearly illustrated in the drawings, and I further purpose to treat likewise the side member 3, except that the same is returned sufficiently to be engaged along its upper edge and depressed somewhat against its own resiliency by the glass 4', thereby effectually preventing the entrance of cinders and the like into the gutter 5'' of the astragal aforenamed, and to still further enhance this desirable effect the gutter 5''', formed by such returning of the side member 3, is filled with packing material 3''', fibrous asbestos being preferred.

Between the lapped portions of the panes of glass 4' I dispose a retaining-clip whose prime function is to grasp and hold the panes of glass each in its proper relation to the other. To this end said clip is here shown as comprising a main portion 6, provided with oppositely-turned lips 6' 6'', at and extending suitably along its respective edges. The overlapping pane of glass engages at its lower edge the lip 6', and the underlapping pane of glass engages at its upper edge the lip 6''. Hence the respective panes of glass are held by said clip in proper relation each to the other, particularly when adjusted at an inclination transversely of the clip, as in common practice.

For the dual purpose of securing a cushion effect between the lapped portions of the panes of glass 4' and a tight juncture thereat I purpose to oppositely channel the main portion 6 of the clip aforenamed, which channeling effect may be readily accomplished by crimping said portion 6 in opposite directions and as indicated by the numerals 7 7' in the drawings. Accordingly the channels thus formed open oppositely toward the respective panes of glass employed at the lapped portions thereof, and in each of said channels I dispose packing material 7'', fibrous asbestos being preferred, and said packing material being directly engaged by the respective panes of glass, as will be clearly understood. The lip 6'' is sufficiently extended and returned somewhat, but not to or in engagement with the pane of glass above it, for the formation of a condensation-gutter 7''', which discharges into the gutter 5'', from which latter the water of condensation is conducted away in any approved manner.

For checking the flow of condensation-water along the under side of the glass 4' and directing it into the gutter 7''', I purpose to elevate the main portion 6, contiguous to the lip 6'', to engagement with the glass 4' above it, substantially as indicated at 8 in the drawings; and when this is done the cushion effect aforenamed between the lapped portions of the panes of glass availed of takes place mainly at the packing material 7'' disposed in the downwardly-opening channel of the portion 6 and directly engaged by the underlapping pane of glass.

The packing material 7'', and likewise that in the gutter formed by returning the side member 3 of the packing-clip aforenamed, may be readily arranged to compensate for any irregularities in the panes of glass, and when the cap 4'' is in place a construction in which the panes of glass are at all times yieldingly disposed and the junctures at the lapped portions of the panes of glass are rendered tight is provided.

The kinking of the astragal made use of, as indicated in the drawings, facilitates the adjustment of the panes of glass for a lapped relation, as herein specified.

It will be seen that my improved glazed structure is particularly well adapted for the purposes for which it is intended, and, further, that the same may be modified somewhat without departure from the principle and spirit of my invention.

Having described my invention, what I claim, and desire to secure by Letters Patent, is—

1. A glazed structure comprising an astragal having a vertical side flange; a shielding packing-clip straddling said flange; packing material between said packing-clip and said flange and shielded by the former; panes of glass on said packing-clip; and means for exerting a yielding pressure downwardly on said panes of glass, substantially as herein specified.

2. The combination with an astragal having upwardly-turned side flanges, panes of glass supported thereby, and a cap bearing against the upper margin of the panes, of clips on the astragal flanges, said clips, respectively, having downwardly-bent sides which grasp the side flanges of the astragal, one of said sides being bent at its lower edge upwardly at an angle and extending upward higher than the main body of the clip to bear against the lower margin of the pane or panes of glass above it, substantially as herein specified.

3. The combination with an astragal having upwardly-turned side flanges, panes of glass supported thereby, and a cap for bearing against the upper margin of the panes, of longitudinally-extending clips having downwardly-turned sides, respectively, fitting over and clasping said flanges, one of said sides being upwardly turned to form a resilient bearing edge to support the pane or panes above it, and the other side being bent to form a condensation-gutter, substantially as herein specified.

4. The combination with an astragal having upwardly-turned side flanges, panes of glass supported thereby, a cap having outwardly and downwardly flared straight sides, and means for forcing said cap downward on the margin of said panes, of clips having, respectively, sides fitting on and clasping said flanges, one of the sides of said clips, respectively, being bent upward and outward from its lower edge, and extending above the main body of the clip to form a resilient bearing edge for the under margin of the pane or panes above it, substantially as herein specified.

5. The combination with an astragal having side flanges for supporting panes of glass, of clips on said side flanges, said clips, respectively, having sides which grasp the said flanges, and one of said sides being bent, at its edge, upwardly at an angle, and extended above the main body of the clip to form a resilient support for a pane or panes of glass, substantially as herein specified.

6. A glazed structure comprising an astragal having a vertical side flange; a shielding packing-clip consisting of opposing, connected, depending side members, straddling said flange; panes of glass on said packing-clip, one of said side members being returned somewhat to form a condensation-gutter at the outer side of said flange, and the other being returned to form a packing-gutter at the inner side of said flange; packing material between said packing-clip and said flange; packing material in said packing-gutter; and means for exerting a yielding pressure downwardly on said glass, substantially as herein specified.

7. In a glazed structure, the combination with inclined panes of glass lapping in the direction of the inclination thereof, of a holding-clip between the lapped margins of said panes of glass, said clip comprising a main portion having longitudinal packing-channels at the opposite sides thereof, and oppositely-turned lips or holding members at opposite edges thereof, for engagement, the one with the lower edge and the other with the upper edge of said panes of glass, respectively; and packing material inserted in said packing-channels between said clip and the lapping margins of said panes of glass, respectively, substantially as herein specified.

8. In a glazed structure, the combination with inclined panes of glass lapping in the direction of the inclination thereof, of a holding-clip between the lapped margins of said panes of glass, said clip comprising a main portion having a bearing-surface near its upper edge and a longitudinal packing-channel below said bearing-surface, and oppositely-turned lips or holding members at opposite edges thereof, for engagement, the one with the lower edge and the other with the upper edge of said panes of glass, respectively; and packing material inserted in said packing-channel between said clip and the lapped margin of the adjacent pane of glass, substantially as herein specified.

9. In a glazed structure, the combination with inclined panes of glass lapping in the direction of the inclination thereof, of a holding-clip between the lapped margins of said panes of glass, said clip comprising a main portion having a bearing-surface near its upper edge and a longitudinal packing-channel below said bearing-surface, and oppositely-turned lips or holding members at opposite edges thereof, for engagement, the one with the lower edge and the other with the upper edge of said panes of glass, respectively, and one of said holding members being returned to form a condensation-gutter above said bearing-surface; and packing material inserted in said packing-channel between said clip and the lapped margin of the adjacent pane of glass, substantially as herein specified.

10. A glazed structure comprising an astragal; lapped panes of glass supported by said astragal; a retaining-clip between said panes of glass at the lapped portions thereof, said clip consisting of a main, oppositely-channeled member, having oppositely-turned lips at its respective edges for the engagement of the respective panes of glass, and whereby the latter are held against displacement, one along the other; packing material in the opposite channels of said clip for the direct engagement of said panes of glass, respectively, and means for exerting a yielding pressure downwardly on said panes of glass, substantially as herein specified.

11. In a glazed structure, a retaining-clip for lapped panes of glass, consisting of a reversely-channeled, main member having upwardly and downwardly turned lips at opposite edges, respectively, thereof, one of said lips being returned to form a condensation-gutter, substantially as herein specified.

12. In a glazed structure, the combination with a packing-clip, consisting of opposing, depending, connected side members forming a recess for receiving and shielding packing material, of packing material disposed in said recess, one of said side members being returned to form a condensation-gutter on the outer side of the astragal, substantially as herein specified.

13. In a glazed structure, the combination with a packing-clip, consisting of opposing, depending, connected side members forming a recess for receiving and shielding packing material, of packing material disposed in said recess, one of said side members being returned to form a condensation-gutter, and the other returned to form a gutter for additional packing material, substantially as herein specified.

14. A glazed structure comprising an astragal having a vertical side flange; a packing-holder consisting of opposing, connected, depending side members; straddling said flange; panes of glass on said holder, one of said side members being returned to and in engagement with said panes of glass, within the gutter of said astragal; and means for exerting a yielding pressure downwardly on said panes of glass, substantially as herein specified.

15. A glazed structure comprising an astragal having a vertical side flange; a packing-holder consisting of opposing, connected, depending side members, straddling said flange; panes of glass on said holder, one of said side members being returned to form a packing-gutter within the gutter of said astragal; packing material within said packing-gutter; and means for exerting a yielding pressure downwardly on said panes of glass, substantially as herein specified.

ROBERT N. SCHALKENBACH.

Witnesses:
W. H. RUBY,
F. B. WRIGHT.